(12) United States Patent
Reisacher et al.

(10) Patent No.: US 8,747,544 B2
(45) Date of Patent: Jun. 10, 2014

(54) SOLID SILICA PREPARATION

(75) Inventors: Hans Ulrich Reisacher, Maxdorf (DE); Uwe Mauthe, Mannheim (DE)

(73) Assignee: BASF SE, Ludwigshafen (DE)

( * ) Notice: Subject to any disclaimer, the term of this patent is extended or adjusted under 35 U.S.C. 154(b) by 341 days.

(21) Appl. No.: 12/865,409

(22) PCT Filed: Feb. 12, 2009

(86) PCT No.: PCT/EP2009/051605
§ 371 (c)(1),
(2), (4) Date: Jul. 30, 2010

(87) PCT Pub. No.: WO2009/101121
PCT Pub. Date: Aug. 20, 2009

(65) Prior Publication Data
US 2010/0326325 A1    Dec. 30, 2010

(30) Foreign Application Priority Data

Feb. 14, 2008    (EP) .................................... 08151429

(51) Int. Cl.
*C08K 3/36*    (2006.01)

(52) U.S. Cl.
USPC .......................................................... 106/482

(58) Field of Classification Search
USPC .................................. 428/206, 331; 106/482
See application file for complete search history.

(56) References Cited

U.S. PATENT DOCUMENTS

| | | | | |
|---|---|---|---|---|
| 5,266,383 A | * | 11/1993 | Sakaki et al. | 428/32.18 |
| 5,521,002 A | * | 5/1996 | Sneed | 428/331 |
| 7,446,233 B1 | | 11/2008 | Miyanaga | |
| 7,625,971 B2 | * | 12/2009 | Tokunaga et al. | 524/492 |
| 2002/0182391 A1 | * | 12/2002 | Migliorini et al. | 428/216 |
| 2006/0134423 A1 | * | 6/2006 | Malet et al. | 428/403 |

FOREIGN PATENT DOCUMENTS

| | | |
|---|---|---|
| CN | 1374988 A | 10/2002 |
| EP | 1 160 279 | 12/2001 |
| JP | 4 37603 | 2/1992 |
| JP | 10 279997 | 10/1998 |

OTHER PUBLICATIONS

International Search Report issued Sep. 22, 2010 in PCT/EP09/051605 filed Feb. 12, 2009.

* cited by examiner

*Primary Examiner* — Pegah Parvini
(74) *Attorney, Agent, or Firm* — Oblon, Spivak, McClelland, Maier & Neustadt, L.L.P.

(57) ABSTRACT

The present invention relates to solid silica preparations composed of the components (A) 20% to 80% by weight, based on the total weight of the preparation, of a silica;

(B) 20% to 50% by weight, based on the total weight of the preparation, of at least one additive selected from the group consisting of a water-soluble, nonionic, surface-active additive based on polyethers, a water-soluble, surface-active additive containing carboxylate groups, a polyurethane, an anionic, surface-active additive based on acidic phosphoric, phosphonic, sulfuric or sulfonic esters;

(C) if appropriate, further components, the further components comprising no pigments, and the sum of all components (A), (B), and (C) making 100% by weight.

The invention further relates to methods of producing them and also to methods of coloring high molecular mass organic or inorganic materials, more particularly of coloring plastics.

6 Claims, No Drawings

SOLID SILICA PREPARATION

The present invention relates to solid silica preparations, to methods of producing them and also to methods of introduction into high molecular mass organic or inorganic materials, such as varnishes, paints, and plastics, for example.

For the pigmentation of liquid systems, such as coating materials, varnishes, emulsion paints, and printing inks, it is common to use pigment formulations which comprise water, organic solvent or mixtures thereof. In this context, further components are typically used. Besides anionic, cationic, nonionic or amphoteric dispersants, such formulations generally contain further auxiliaries for setting flow properties and drying properties, agents for increasing freeze resistance, thickeners, antiskin agents, and biocides.

Furthermore, matting agents also represent such auxiliaries. Matting agents based on precipitated silicas are known in the prior art and have the following disadvantages: the high porosity results in a high demand for binder and solvent. Even with a level of 50% by weight of water, silicas of this kind are free-flowing powders. Moreover, wetting is necessary prior to use, for example, of coating materials, so that water is displaced from the capillaries of the silica. Moreover, precipitated silicas of this kind have a low bulk volume, and hence are highly dusting. For these reasons, silicas in liquid dispersions usually have a very low level, and typically no levels >20% by weight are obtained. The matting effect is also very heavily dependent on the dispersing of the matting agent.

Comparable profiles of properties to matting agents based on precipitated silica are also possessed by auxiliaries based on fumed silicas that are used to control rheology, sedimentation, adhesion, and scratch resistance and for pigment stabilization. Incorporation into varnishes and paints is typically accomplished by means of suitable dispersing assemblies such as ball mills and bead mills There is therefore a need for auxiliaries, such as matting agents, for example, based on silicas, which do not have at least some of the disadvantages described above, and which in particular feature low dusting, high ease of metering with stir-in properties, and/or a capacity to be incorporated directly into varnishes and paints, for example, by stirring without prior wetting.

This object is achieved by means of a solid silica preparation composed of the components
(A) 20% to 80% by weight, based on the total weight of the preparation, of a silica;
(B) 20% to 50% by weight, based on the total weight of the preparation, of at least one additive selected from the group consisting of a water-soluble, nonionic, surface-active additive based on polyethers, a water-soluble, surface-active additive containing carboxylate groups, a polyurethane, an anionic, surface-active additive based on acidic phosphoric, phosphonic, sulfuric or sulfonic esters;
(C) if appropriate, further components, the further components comprising no pigments, and the sum of all components (A), (B), and (C) making 100% by weight.

It has in fact been found that the solid silica preparations of the invention do not have at least some of the disadvantages identified above. In particular it is possible, by virtue of the solid silica preparations of the invention, to enable dust-free weighing and direct addition to varnishes and paints. Furthermore, bulk volumes of more than 200 g/l can be achieved. In addition, metering is accomplished easily via metering apparatus for solids handling (granules). A high level of silica can also be attained. The silica preparations of the invention require no prior wetting, and the preparation does not absorb water to a comparable extent from aqueous varnishes and paints, with the consequence of binder flocculation.

The solid silica preparations of the invention additionally feature high compatibility in various film-forming media and binders, and do not to a comparable extent exhibit problems with different refractive indices, which can lead to problems as a result of irreducible residues of air and water in pores.

The solid silica preparation of the present invention comprises as component (A) 20% to 80% by weight, based on the total weight of the preparation, of a silica.

The fraction of component (A) is preferably 30% to 60% by weight, based on the total weight of the preparation.

In principle, any precipitated and dried silicas may serve as a constituent of component (A). Fumed silicas can be employed as well. These silicas may, if appropriate, be ground after drying, or may be provided with an aftertreatment, such as waxes or silicates. It is of course also possible for different silicas, differing in their origin, to serve in the form of mixtures as component (A) of the solid silica preparation of the present specification.

For the purposes of the present invention the term "silica" also refers to silicon dioxide.

Precipitated silicas are typically obtained by reaction of waterglass with sulfuric acid.

Fumed silicas are typically obtained by reaction of silicon tetrachloride with water, with deposition of hydrogen chloride gases, by means of flame hydrolysis.

Examples of manufacturers of silicas include Evonik (Sipernat®, Ultrasil®, and Sident®, Aerosil®, Aerodisp®, Aeroxide®, Aeroperl®, Acematt®), Wacker Chemie AG (HDK®), Dupont (LoVel, HiSil), Grace (Syloid®).

The solid silica preparation of the invention further comprises 20% to 50% by weight, based on the total weight of the preparation, of at least one additive selected from the group consisting of a water-soluble, nonionic, surface-active additive based on polyethers (B1), a water-soluble, surface-active additive containing carboxylate groups (B2), a polyurethane (B3), an anionic, surface-active additive based on acidic phosphoric, phosphonic, sulfuric or sulfonic esters (B4).

The abovementioned surface-active additives which form component (B) preferably have a fraction of 30% to 50% by weight, based on the total weight of the preparation.

It is possible for one additive or a mixture of two or more additives to form component (B) of the solid silica preparation of the invention.

Besides the unmixed polyalkylene oxides, preferably $C_2$-$C_4$ alkylene oxides and phenyl-substituted $C_2$-$C_4$ alkylene oxides, more particularly polyethylene oxides, polypropylene oxides, and poly(phenylethylene oxides), suitability is possessed here principally by block copolymers, more particularly polymers containing polypropylene oxide and polyethylene oxide blocks or poly(phenylethylene oxide) and polyethylene oxide blocks, and also by random copolymers of these alkylene oxides, as component B1.

These polyalkylene oxides may be prepared by polyaddition of the alkylene oxides with starter molecules, such as saturated or unsaturated aliphatic and aromatic alcohols, saturated or unsaturated aliphatic and aromatic amines, saturated or unsaturated aliphatic carboxylic acids and carboxamides, and also aromatic carboxamides and sulfonamides. These aromatic starter molecules may be substituted by $C_1$-$C_{20}$ alkyl or $C_7$-$C_{30}$ aralkyl. Typically 1 to 300 mol, preferably 3 to 150 mol, of alkylene oxide are used per mole of starter molecule; in the case of aromatic starter molecules, the amounts of alkylene oxide are principally 2 to 100 mol, preferably 5 to 50 mol, and more particularly 10 to 30 mol. The polyaddition products may have a terminal OH group or may be end group-capped—for example, in the form of $C_1$-$C_6$ alkyl ethers.

Suitable aliphatic alcohols in this context generally comprise 6 to 26 C atoms, preferably 8 to 18 C atoms, and may be of unbranched, branched or cyclic construction. Examples include octanol, nonanol, decanol, isodecanol, undecanol, dodecanol, 2-butyloctanol, tridecanol, isotridecanol, tetradecanol, pentadecanol, hexadecanol (cetyl alcohol), 2-hexyldecanol, heptadecanol, octadecanol (stearyl alcohol), 2-heptylundecanol, 2-octyldecanol, 2-nonyltridecanol, 2-decyltetradecanol, oleyl alcohol, and 9-octadecenol, and also mixtures of these alcohols, such as $C_8/C_{10}$, $C_{13}/C_{15}$, and $C_{16}/C_{18}$ alcohols, and cyclopentanol and cyclohexanol. Of particular interest are the saturated and unsaturated fatty alcohols which are obtained by cleavage of fats and reduction from natural raw materials, and the synthetic fatty alcohols from the oxo process. The alkylene oxide adducts with these alcohols typically have average molecular weights $M_n$ of 200 to 5000.

Examples of the abovementioned aromatic alcohols, besides unsubstituted phenol and α- and β-naphthol, also include the alkyl-substituted products, substituted more particularly by $C_1$-$C_{12}$ alkyl, preferably $C_4$-$C_{12}$ or $C_1$-$C_4$ alkyl, and the aralkyl-substituted products, more particularly $C_7$-$C_{30}$ aralkyl-substituted phenol, such as hexylphenol, heptylphenol, octylphenol, nonylphenol, isononylphenol, undecylphenol, dodecylphenol, di- and tributylphenol, and dinonylphenol, and also bisphenol A and its products of reaction with styrene, principally bisphenol A substituted in the positions ortho to both OH groups by a total of 4 1-phenylethyl radicals.

As well as the alkylene oxide adducts with monofunctional amines and alcohols, very particular interest attaches to the alkylene oxide adducts of at least difunctional amines and alcohols.

Preferred at least difunctional amines are difunctional to pentafunctional amines which conform in particular to the formula $H_2N$—$(R$—$NR^1)_n$—$H$ (R: $C_2$-$C_6$ alkylene; $R^1$: hydrogen or $C_1$-$C_6$ alkyl; n: 1 to 5). Specific examples include the following: ethylenediamine, diethylenetriamine, triethylenetetramine, tetraethylenepentamine, propylene-1,3-diamine, dipropylenetriamine, 3-amino-1-ethylenaminopropane, hexamethylenediamine, di-hexamethylenetriamine, 1,6-bis(3-aminopropylamino)hexane, and N-methyldipropylenetriamine, with hexamethylenediamine and diethylenetriamine being particularly preferred, and ethylenediamine being very particularly preferred.

Preferably these amines are reacted first with propylene oxide and then with ethylene oxide. The ethylene oxide content of the block copolymers is typically about 10% to 90% by weight.

The block copolymers based on polyfunctional amines generally have average molecular weights $M_n$ of 1000 to 40 000, preferably 1500 to 30 000.

Preferred at least difunctional alcohols are dihydric to pentahydric alcohols. Examples include $C_2$-$C_6$ alkylene glycols and the corresponding di- and polyalkylene glycols, such as ethylene glycol, propylene 1,2- and 1,3-glycol, butylene 1,2- and 1,4-glycol, hexylene 1,6-glycol, dipropylene glycol, and polyethylene glycol, glycerol and pentaerythritol, with ethylene glycol and polyethylene glycol being particularly preferred, and propylene glycol and dipropylene glycol being very particularly preferred.

Particularly preferred alkylene oxide adducts with at least difunctional alcohols have a central polypropylene oxide block, in other words start from a propylene glycol or polypropylene glycol, which is reacted first with further propylene oxide and then with ethylene oxide. The ethylene oxide content of the block copolymers is typically 10% to 90% by weight.

The block copolymers based on polyhydric alcohols generally have average molecular weights $M_n$ of 1000 to 20 000, preferably 1000 to 15 000.

Alkylene oxide block copolymers of this kind are known and are available commercially, for example, under the names Tetronic® and Pluronic® (BASF).

Suitable anionic water-soluble surface-active additives based on polymers of unsaturated carboxylic acids (B2) include, in particular, additives from the group of the homopolymers and copolymers of ethylenically unsaturated monocarboxylic acids and/or ethylenically unsaturated dicarboxylic acids, which may additionally comprise in copolymerized form vinyl monomers that do not comprise an acid function, and further include the alkoxylation products of these homopolymers and copolymers, and the salts of these homopolymers and copolymers and their alkoxylation products.

Examples of the carboxyl-containing monomers and the vinyl monomers include the following:

acrylic acid, methacrylic acid, and crotonic acid;

maleic acid, maleic anhydride, maleic monoesters, maleic monoamides, reaction products of maleic acid with diamines, which may be oxidized to give derivatives containing amine oxide groups, and fumaric acid, preference being given to maleic acid, maleic anhydride, and maleic monoamides;

vinylaromatics, such as styrene, methylstyrene, and vinyltoluene; ethylene, propylene, isobutene, diisobutene, and butadiene; vinyl ethers, such as polyethylene glycol monovinyl ether; vinyl esters of linear or branched monocarboxylic acids, such as vinyl acetate and vinyl propionate; alkyl esters and aryl esters of ethylenically unsaturated monocarboxylic acids, more particularly acrylic and methacrylic esters, such as methyl, ethyl, propyl, isopropyl, butyl, pentyl, hexyl, 2-ethylhexyl, nonyl, lauryl, and hydroxyethyl (meth)acrylate, and also phenyl, naphthyl, and benzyl (meth)acrylate; dialkyl esters of ethylenically unsaturated dicarboxylic acids, such as dimethyl, diethyl, dipropyl, diisopropyl, dibutyl, dipentyl, dihexyl, di-2-ethylhexyl, dinonyl, dilauryl, and di-2-hydroxyethyl maleate and fumarate; vinylpyrrolidone; acrylonitrile and methacrylonitrile, preference being given to styrene, isobutene, diisobutene, acrylic esters, and polyethylene glycol monovinyl ethers.

Examples of preferred homopolymers of these monomers include, in particular, polyacrylic acids.

The copolymers of the stated monomers may be constructed from two or more, more particularly three, different monomers. Those present may be random copolymers, alternating copolymers, block copolymers, and graft copolymers. Preferred copolymers include styrene/acrylic acid, acrylic acid/maleic acid, acrylic acid/methacrylic acid, butadiene/acrylic acid, isobutene/maleic acid, diisobutene/maleic acid, and styrene/maleic acid copolymers, each of which may comprise acrylic esters and/or maleic esters as additional monomer constituents.

The carboxyl groups of the unalkoxylated homopolymers and copolymers are preferably present at least partly in salt form, in order to ensure solubility in water. Examples of suitable salts are the alkali metal salts, such as sodium salts and potassium salts, and the ammonium salts.

The unalkoxylated polymeric additives (B2) typically have average molecular weights $M_w$ of 900 to 250 000. The molecular weight ranges that are particularly suitable for the individual polymers depend, of course, on their composition. Molecular weight indications are given below by way of example for a variety of polymers: polyacrylic acids: $M_w$ from 900 to 250 000; styrene/acrylic acid copolymers: $M_w$ from 1000 to 50 000; acrylic acid/methacrylic acid copolymers: $M_w$ from 1000 to 250 000; acrylic acid/maleic acid copolymers: $M_w$ from 2000 to 70 000.

Besides these homopolymers and copolymers themselves, their alkoxylation products are also of particular interest as additives (B2).

The polymers in question here are principally the polymers which are esterified partly to (as far as is possible) completely with polyether alcohols. In general the degree of esterification of these polymers is 30 to 80 mol %.

Suitability for the esterification is possessed in particular by alcohols such as ethanol, propanol, isopropanol, butanol, fatty alcohols, the polyether alcohols themselves, preferably polyethylene glycols and polypropylene glycols, and also their derivatives with end group capping at one end, principally the corresponding monoethers, such as monoaryl ethers, monophenyl ethers for example, and, in particular, mono-$C_1$-$C_{26}$ alkyl ethers, examples being ethylene glycols and propylene glycols etherified with fatty alcohols, and the polytheramines, which are preparable, for example, by converting a terminal OH group of the corresponding polyether alcohols or by polyaddition of alkylene oxides with preferably primary aliphatic amines. Preference is given in this context to polyethylene glycols, polyethylene glycol monoethers, and polytheramines. The average molecular weights $M_n$, of the polyether alcohols and their derivatives that are used are typically 200 to 10 000.

By controlling the ratio of polar to apolar groups it is possible to tailor the surface-active properties of the additives (B2).

Anionic surface-active additives (B2) of this kind are likewise known and are available commercially, for example, under the names Sokalan® (BASF), Joncryl® (Johnson Polymer), Alcosperse® (Alco), Geropon® (Rhodia), Good-Rite® (Goodrich), Neoresin® (Avecia), Orotan®, and Morez® (Rohm & Haas), Disperbyk® (Byk), and Tegospers® (Degussa).

As anionic surface-active additives, these preparations may further comprise polyurethane-based additives (B3).

The term "polyurethane" in this context encompasses not only the pure reaction products of polyfunctional isocyanates (B3a) with isocyanate-reactive organic compounds (B3b) comprising hydroxyl groups, but also those reaction products which are additionally functionalized as a result of the addition of further isocyanate-reactive compounds, such as of carboxylic acids which carry primary or secondary amino groups, for example.

These additives are notable in relation to other surface-active additives for their low ionic conductivity and their neutral pH.

Particularly suitable polyfunctional isocyanates (B3a) for the preparation of the additives (B3) are diisocyanates, although it is also possible to use compounds having three or four isocyanate groups. Both aromatic and aliphatic isocyanates can be used. Examples of preferred diisocyanates and triisocyanates include the following: 2,4-tolylene diisocyanate (2,4-TDI), 4,4'-diphenylmethane diisocyanate (4,4'-MDI), para-xylylene diisocyanate, 1,4-diisocyanatobenzene, tetramethylxylylene diisocyanate (TMXDI), 2,4'-diphenylmethane diisocyanate (2,4'-MDI) and triisocyanatotoluene, and also isophorone diisocyanate (IPDI), 2-butyl-2-ethylpentamethylene diisocyanate, tetramethylene diisocyanate, hexamethylene diisocyanate, dodecamethylene diisocyanate, 2,2-bis(4-isocyanatocyclohexyl)propane, trimethylhexane diisocyanate, 2-isocyanatopropylcyclohexyl isocyanate, 2,4,4- and 2,2,4-trimethylhexamethylene diisocyanate, 2,4'-methylenebis(cyclohexyl) diisocyanate, cis-cyclohexane 1,4-diisocyanate, trans-cyclohexane 1,4-diisocyanate, and 4-methylcyclohexane 1,3-diisocyanate (H-TDI).

It will be appreciated that mixtures of isocyanates (B3a) can also be used. Mention may be made here, by way of example, of the following: mixtures of structural isomers of 2,4-tolylene diisocyanate and triisocyanatotoluene, e.g., mixtures of 80 mol % 2,4-tolylene diisocyanate and 20 mol % 2,6-tolylene diisocyanate; mixtures of cis- and trans-cyclohexane 1,4-diisocyanate; mixtures of 2,4- or 2,6-tolylene diisocyanate with aliphatic diisocyanates, such as hexamethylene diisocyanate and isophorone diisocyanate.

Suitable isocyanate-reactive organic compounds (B3b) are preferably compounds having at least two isocyanate-reactive hydroxyl groups per molecule. Suitability as compound (B3b) is also possessed, however, by compounds which contain only one isocyanate-reactive hydroxyl group per molecule. These monofunctionalized compounds may replace some or all of the compounds comprising at least two isocyanate-reactive hydroxyl groups per molecule in the context of the reaction with the polyisocyanate (B3a).

Set out below are examples of particularly preferred isocyanate-reactive compounds (B3b) having at least two isocyanate-reactive hydroxyl groups per molecule.

These are polyetherdiols, polyesterdiols, lactone-based polyesterdiols, diols and triols having up to 12 C atoms, dihydroxycarboxylic acids, dihydroxysulfonic acids, dihydroxyphosphonic acids, polycarbonate diols, polyhydroxy olefins, and polysiloxanes having on average at least two hydroxyl groups per molecule.

Suitable polyetherdiols (B3b) are, for example, homopolymers and copolymers of $C_2$-$C_4$ alkylene oxides, such as ethylene oxide, propylene oxide, and butylene oxide, tetrahydrofuran, styrene oxide and/or epichlorohydrin, which are obtainable in the presence of a suitable catalyst, boron trifluoride for example. Polyetherdiols additionally suitable are obtainable by (co)polymerization of these compounds in the presence of a starter having at least two acidic hydrogen atoms, such as of water, ethylene glycol, thioglycol, mercaptoethanol, 1,3-propanediol, 1,4-butanediol, 1,6-hexanediol, 1,12-dodecanediol, ethylenediamine, aniline or 1,2-di(4-hydroxyphenyl)propane.

Examples of particularly suitable polyetherdiols (B3b) are polyethylene glycol, polypropylene glycol, polybutylene glycol, and polytetrahydrofuran, and also copolymers thereof.

The molecular weight $M_n$ of the polyetherdiols is preferably 250 to 5000, more preferably 500 to 2500.

Polyesterdiols (hydroxypolyesters) with suitability as isocyanate-reactive compound (B3b) are common knowledge.

Preferred polyesterdiols (B3b) are the reaction products of diols with dicarboxylic acids or their reactive derivatives, examples being anhydrides or dimethyl esters.

Suitable dicarboxylic acids are saturated and unsaturated aliphatic and also aromatic dicarboxylic acids, which may carry additional substituents, such as halogen. Preferred aliphatic dicarboxylic acids are saturated unbranched α,ω-dicarboxylic acids which comprise 3 to 22, principally 4 to 12, C atoms.

Examples of particularly suitable dicarboxylic acids are as follows: succinic acid, glutaric acid, adipic acid, suberic acid, azelaic acid, sebacic acid, 1,12-dodecanedicarboxylic acid, maleic acid, maleic anhydride, fumaric acid, itaconic acid, phthalic acid, isophthalic acid, phthalic anhydride, tetrahydrophthalic anhydride hexahydrophthalic anhydride, tetrachlorophthalic anhydride, endomethylenetetrahydrophthalic anhydride, terephthalic acid, dimethyl terephthalate, and dimethyl isophthalate.

Particularly suitable diols are saturated and unsaturated aliphatic and cycloaliphatic diols. The particularly preferred aliphatic α,ω-diols are unbranched and have 2 to 12, more particularly 2 to 8, principally 2 to 4, C atoms. Preferred cycloaliphatic diols derive from cyclohexane.

Examples of particularly suitable diols are as follows: ethylene glycol, propylene glycol, 1,3-propanediol, 1,4-butanediol, 2-methylpropane-1,3-diol, 1,5-pentanediol, neopentyl glycol, 1,6-hexanediol, 1,8-octanediol, 1,10-decanediol, 1,12-dodecanediol, cis- and trans-but-2-ene-1,4-diol, 2-butyne-1,4-diol, and cis- and trans-1,4-di(hydroxymethyl)cyclohexane.

The molecular weight $M_n$ of the polyesterdiols is preferably 300 to 5000.

Lactone-based polyesterdiols with suitability as isocyanate-reactive compound (B3b) are based more particularly on aliphatic, saturated, unbranched ω-hydroxycarboxylic acids having 4 to 22, preferably 4 to 8, C atoms. Also suitable are branched ω-hydroxycarboxylic acids in which one or more —$CH_2$— groups in the alkylene chain have been replaced by —$CH(C_1$-$C_4$ alkyl)-.

Examples of preferred ω-hydroxycarboxylic acids are γ-hydroxybutyric acid and δ-hydroxyvaleric acid.

It will be appreciated that the abovementioned diols are also suitable as isocyanatereactive compounds (B3b), the preferences which apply being the same as those above.

Likewise suitable as isocyanate-reactive compounds (B3b) are triols which have 3 to 12 C atoms in particular and 3 to 8 C atoms principally. An example of a particularly suitable triol is trimethylolpropane.

Dihydroxycarboxylic acids with suitability as isocyanate-reactive compounds (B3b) are, in particular, aliphatic saturated dihydroxycarboxylic acids which comprise preferably 4 to 14 C atoms, with particular suitability. Especially suitable are dihydroxycarboxylic acids of the formula

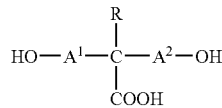

in which $A^1$ and $A^2$ are identical or different $C_1$-$C_4$ alkylene radicals and R is hydrogen or $C_1$-$C_4$ alkyl.

A particularly preferred example of these dihydroxycarboxylic acids is dimethylolpropionic acid (DMPA).

Additionally suitable as isocyanate-reactive compounds (B3b) are the corresponding dihydroxysulfonic acids and dihydroxyphosphonic acids, such as 2,3-dihydroxypropanephosphonic acid.

The term "dihydroxycarboxylic acid" is also intended in this context to encompass compounds which comprise more than one carboxyl function (or anhydride or ester function, respectively). Compounds of this kind are obtainable by reaction of dihydroxy compounds with tetracarboxylic dianhydrides, such as pyromellitic dianhydride or cyclopentanetetracarboxylic dianhydride, in a molar ratio of 2:1 to 1.05:1, in a polyaddition reaction, and preferably have an average molecular weight $M_n$ of 500 to 10 000.

Examples of suitable polycarbonatediols (B3b) are the reaction products of phosgene with an excess of diols, more particularly unbranched saturated aliphatic α,ω-diols having 2 to 12, more particularly 2 to 8, principally 2 to 4 C atoms.

Polyhydroxyolefins with suitability as isocyanate-reactive compound (B3b) are principally α,ωdihydroxyolefins, preference being given to α,ω-dihydroxybutadienes.

The polysiloxanes that are additionally suitable as isocyanate-reactive compound (B3b) comprise on average at least two hydroxyl groups per molecule. Particularly suitable polysiloxanes have on average 5 to 200 Si atoms (numerical average) and are principally substituted by $C_1$-$C_{12}$ alkyl groups, more particularly methyl groups.

Examples of isocyanate-reactive compounds (B3b) which have only one isocyanatereactive hydroxyl group include, in particular, aliphatic, cycloaliphatic, araliphatic or aromatic monohydroxycarboxylic acids and monohydroxysulfonic acids.

The polyurethane-based additives (B3) are prepared by reacting the compounds (B3a) and (B3b), the molar ratio of (B3a) to (B3b) being generally 2:1 to 1:1, preferably 1.2:1 to 1:1.2.

In this context it is possible, in addition to the aforementioned isocyanate-reactive compounds (B3b), to add further compounds containing isocyanate-reactive groups, examples being dithiols, thioalcohols, such as thioethanol, amino alcohols, such as ethanolamine and N-methylethanolamine, or diamines, such as ethylenediamine, and so to prepare polyurethanes which as well as the urethane groups also carry isocyanurate groups, allophanate groups, urea groups, biuret groups, uretdione groups or carbodiimide groups. Further examples of such isocyanate-reactive compounds are aliphatic, cycloaliphatic, araliphatic or aromatic carboxylic acids and sulfonic acids which carry at least two primary and/or secondary amino groups.

It will be appreciated that it is also possible to add corresponding compounds containing only one isocyanate-reactive group, examples being monoalcohols, primary and secondary monoamines, monoaminocarboxylic and monoaminosulfonic acids, and mercaptans. Typical amounts for use are up to 10 mol %, based on (B3a).

Preferably at least some of the carboxyl groups of the reaction products (B3) are in salt form, in order to ensure solubility in water. Examples of suitable salts include alkali metal salts, such as sodium salts and potassium salts, and ammonium salts.

The additives (B3) typically have average molecular weights $M_w$ of 500 to 250 000.

By controlling the ratio of polar to apolar groups it is possible to tailor the surface-active properties of the additives (B3).

Anionic surface-active additives (B3) of this kind are known and are available commercially under the name Borchi® GEN SN95 (Borchers), for example.

Water-soluble anionic surface-active additives based on acidic phosphoric, phosphonic, sulfuric and/or sulfonic esters of polyethers (B4) are based more particularly on the reaction products of the above-listed polyethers (B1) with phosphoric acid, phosphorus pentoxide, and phosphonic acid, or with sulfuric acid and sulfonic acid, respectively. In these contexts the polyethers are converted into the corresponding phosphoric monoesters or diesters and phosphonic esters, or into the sulfuric monoesters and sulfonic esters, respectively. These acidic esters are preferably in the form of water-soluble salts, more particularly alkali metal salts, principally sodium salts, and ammonium salts, but may also be used in the form of the free acids.

Preferred phosphates and phosphonates derive principally from alkoxylated, more particularly ethoxylated, fatty alcohols and oxo-process alcohols, alkylphenols, fatty amines, fatty acids, and resin acids; preferred sulfates and sulfonates are based more particularly on alkoxylated, principally ethoxylated, fatty alcohols, alkylphenols, and amines, including polyfunctional amines, such as hexamethylenediamine.

Anionic surface-active additives (B4) of this kind are known and are available commercially, for example, under the names Nekal® (BASF), Tamol® (BASF), Crodafos® (Croda), Rhodafac® (Rhodia), Maphos® (BASF), Texapon® (Cognis), Empicol® (Albright & Wilson), Matexil® (ICI), Soprophor® (Rhodia), and Lutensit® (BASF), Strodex (Dexter).

Water-soluble anionic additives based on aromatic sulfonic acids and formaldehyde (B4) are based more particularly on naphthalenesulfonic acid and are likewise used preferably in salt form, more particularly as a sodium salt. Their average molecular weight Mw is typically 4000 to 15 000. The additives are likewise known and are available commercially, for example, under the name Tamol® (BASF).

Further suitable additives based on aromatic sulfonic acids are alkylbenzenesulfonic acids (Nuosperse®, Elementis) in salt form, more particularly in the form of ammonium salts.

Furthermore, the solid silica preparation according to the present invention may if appropriate comprise further components as component (C). In this case, however, it is important that the further components do not comprise pigments.

Accordingly, where present in the solid silica preparation of the invention, component (C) comprises one further component or two or more further components, it being possible for these components themselves to be composed of one or more substances. In this context it is possible to conceive of any components and substances, examples being antioxidants and/or fillers.

The sum of all of the components of the solid silica preparation of the invention makes 100% by weight.

Thus component (C) may comprise an antioxidant component which in turn comprises one or more antioxidants. Preferably component (C) comprises 0.1% to 5% by weight, based on the total weight of the preparation, of an antioxidant.

Examples of suitable antioxidants include the known classes of sterically hindered phenols, aromatic amines, thiosynergists, phosphites and phosphonites, and sterically hindered amines.

The antioxidants based on sterically hindered phenols comprise as essential building block a phenol which is substituted by at least one tert-butyl group in the ortho position, and more particularly by tert-butyl groups in both ortho positions, to the OH group. The majority of known products comprise two or more of these building blocks, connected to one another via different bridging links.

The antioxidants based on aromatic amines are primarily diarylamines, amine/ketone condensation products, e.g., aniline/acetone condensates, and substituted p-phenylenediamines.

Examples of thiosynergistis are the metal salts of dialkyldithiocarbamic acids, zinc dialkyldithiophosphates, and esters (especially dilauryl, dimyristyl, and distearyl esters) of thiodipropionic acid.

The antioxidants based on phosphites and phosphonites are typically the esters of the corresponding phosphorus acids with alkyl-substituted phenols, more particularly with tert-butyl-substituted phenols.

The antioxidants based on sterically hindered amines (HALS) comprise as an essential building block a 2,6-dialkyl-substituted piperidine, more particularly a 2,6-dimethyl-substituted piperidine, which is linked in position 4, via any of a very wide variety of bridging links, to further piperidine units.

Antioxidants are common knowledge and are obtainable, for example, under the names Irganox®, Irgaphos®, Chimassorb®, and Irgastab® (Ciba), Topanol® (ICI), Hostanox® (Clariant), and Goodrite® (Goodyear).

Furthermore, component (C) of the solid silica preparation of the invention may contain a filler component. This filler component may in turn represent one or more fillers. Preferably component (C) comprises 0.1% to 60% by weight of a filler which has no intrinsic color.

With further preference the fraction is 10% to 30% by weight, based on the total weight of the preparation.

Fillers include colorless or white fillers.

These colorless or white fillers generally have a refractive index ≤1.7. For example, the refractive index of chalk is 1.55, of barite 1.64, of kaolin 1.56, of talc 1.57, of mica 1.58, and of silicates 1.55.

The fillers are typically insoluble in the application medium and originate in particular from the following chemical classes, the list including not only products of natural origin but also products of synthetic origin, by way of example:

oxides and hydroxides; natural: alumina and magnesia; synthetic: aluminum hydroxide and magnesium hydroxide;

talc, kaolin, mica;

carbonates: natural: calcium and magnesium carbonates, such as calcite, chalk, dolomite, and magnesite; synthetic: precipitated calcium carbonate;

sulfates: natural: barium and calcium sulfates, such as barite and gypsum; synthetic: precipitated barium sulfate.

The fillers of component (C) may have any of a very wide variety of particle morphologies. By way of example they may be beads, cubes, flakes or fibers. Fillers of a natural basis typically have particle sizes in the range from about 1 to 300 μm. Thus commercial products based on natural chalk, for example, have a $d_{50}$ of generally 1 to 160 μm. Particle sizes below 1 μm are generally present only in the case of fillers produced synthetically, and especially fillers produced by precipitation processes.

Preferred fillers of component (C) are carbonates and sulfates, particular preference being given to natural and precipitated chalk and also to barium sulfate. These products are available commercially, for example, under the names Omyacarb® and Omyalite® (Omya) and Blanc fixe (Sachtleben).

The solid silica preparation of the invention is advantageously obtained by the production process of the invention, comprising the steps of
(a) wet-comminuting the aqueous suspension comprising components (A) and, if appropriate, (C) and also at least part of component (B);
(b) if appropriate, adding the remaining part of component (B); and
(c) drying the suspension.

More particularly it is of advantage if component (A), any filler component present, which may be part of component (C), is subjected first to wet comminution in aqueous suspension comprising at least part of component (B) and, if appropriate, as a further constituent of component (C), an oxidizing agent component, and the suspension, if appropriate following the addition of the remainder of component (B), is then dried.

In the process of the invention, component (A) and also, if appropriate, parts of component (C) may be used as a dry powder or in the form of a filtercake.

As a function of the selected mode of drying—spray granulation and fluid-bed drying, spraydrying, drying in a paddle dryer, evaporation and subsequent comminution—the particle size of the solid silica preparations of the invention may be controlled in a targeted way.

In the case of spray granulation and fluid-bed granulation, coarse granules having average particle sizes of 50 to 5000 µm, more particularly 100 to 1000 µm, may be obtained. Spray drying typically produces granules having average sizes <20 µm. Finely divided preparations may be obtained in the case of drying in a paddle dryer and in the case of evaporating with subsequent grinding. Preferably, however, the preparations of the invention are in granule form.

Spray granulation is preferably conducted in a spraying tower with a single-fluid nozzle. The suspension here is sprayed in the form of relatively large droplets, the water undergoing evaporation. The additives melt at the temperatures of drying, and so lead to the formation of largely spherical granules with a particularly smooth surface (BET values of generally ≤15 $m^2$/g, more particularly ≤10 $m^2$/g).

The gas entry temperature in the spraying tower is generally 140 to 300° C., preferably 150 to 300° C. The gas exit temperature is generally 70 to 150° C., preferably 70 to 130° C.

The residual moisture content of the granules obtained is preferably <5% by weight.

The preparations of the invention (matting+Aerosil) are notable, on application in application media comprising a liquid phase, for their outstanding coloristic properties, comparable with those of liquid formulations, more particularly their matting capacity, the low dusting behavior, and, principally, for their stir-in behavior—that is, with a very low energy input, they can be distributed by simple stirred incorporation or shaking in the application media without a dust burden. This applies particularly to the coarse granules, which represent the preferred embodiment of the preparations of the invention.

Especially in granule form, the solid silica preparation of the invention has excellent abrasion resistance, little tendency to undergo compaction or clumping, uniform particle-size distribution, good pourability, free-flowability, and meterability, and also absence of dust on handling and application.

The preparations of the invention are outstandingly suitable for coloring high molecular mass organic and inorganic materials of any kind. Liquid application media may also be purely aqueous, may comprise mixtures of water and organic solvents, alcohols for example, or may be based solely on organic solvents, such as alcohols, glycol ethers, ketones, an example being methyl ethyl ketone, amides, examples being N-methylpyrrolidone and dimethylformamide, esters, examples being ethyl acetate and butyl acetate and methoxypropyl acetate, aromatic or aliphatic hydrocarbons, examples being xylene, mineral oil, and benzene.

The present invention accordingly further provides a method of introducing solid silica preparations into high molecular mass organic or inorganic materials, comprising the step of
incorporating, as for example by stirring or shaking, the solid silica preparation of the invention, if appropriate after introduction into a suitable solvent, into the high molecular mass organic or inorganic material.

Thus, for example, the preparations may be stirred into a solvent which is compatible with the respective application medium, this operation being possible in turn with a very low energy input. This may be followed by incorporation into said application medium. Thus, for example, slurries of preparations in glycols or other solvents typical in the paint industry, such as methoxypropyl acetate, may be used, in order to make preparations geared to aqueous systems compatible with varnishes and paints that contain solvent.

Examples of materials to which the preparations of the invention may be added include the following: paints and varnishes, e.g., architectural paints, industrial paints, vehicle paints, radiation-curable paints; coating materials, for both the interior and the exterior architectural sectors, examples being wood coating materials, lime paints, size colors, emulsion paints; printing inks, examples being offset printing inks, flexographic printing inks, toluene gravure inks, textile printing inks, radiation-curable printing inks; other inks, including ink-jet inks; color filters; building materials (typically water is added only after the dry mixing of building material and pigment granules), examples being silicate render systems, cement, concrete, mortar, plaster; asphalt, sealants; cellulosic materials, such as paper, paperboard, cardboard, wood, and woodbase materials, which may have been varnished or otherwise coated; adhesives; film-forming polymeric protective colloids, of the kind used, for example, in the drug industry; cosmetics; detergents.

The preparations of the invention are also outstandingly suitable for plastics.

Mention may be made here, by way of example, of the following classes of plastic and types of plastic:
modified natural substances:
thermosets, e.g., casein plastics; thermoplastics, e.g., cellulose nitrate, cellulose acetate, mixed cellulose esters, and cellulose ethers;
synthetic plastics:
polycondensates: thermosets, e.g., phenolic resin, urea resin, thiourea resin, melamine resin, unsaturated polyester resin, allyl resin, silicone, polyimide, and polybenzimidazole; thermoplastics, e.g. polyamide, polycarbonate, polyester, polyphenylene oxide, polysulfone, and polyvinyl acetal;
addition polymers: thermoplastics, e.g., polyolefins, such as polyethylene, polypropylene, poly-1-butene, and poly-4-methyl-1-pentene, ionomers, polyvinyl chloride, polyvinylidene chloride, polymethyl methacrylate, polyacrylonitrile, polystyrene, polyacetal, fluoro polymers, polyvinyl alcohol, polyvinyl acetate, and poly-p-xylylene, and also copolymers, such as ethylene/vinyl acetate copolymers, styrene/acrylonitrile copolymers, acrylonitrile/butadiene/styrene copolymers, polyethylene glycol terephthalate, and polybutylene glycol terephthalate;
polyadducts: thermosets, e.g., epoxy resin and crosslinked polyurethanes; thermoplastics, e.g., linear polyurethanes and chlorinated polyethers.

The plastics may advantageously be admixed with the preparations of the invention with a low energy input, as for example by coextrusion (preferably with a single-screw or twin-screw extruder), rolling, grinding or kneading. In these contexts they may take the form of plastic masses or melts and may be processed to form plastics moldings, films, and fibers.

In the context of the coloring of plastics as well, the preparations of the invention are notable for application properties that are advantageous overall, and in particular for good matting properties and the good rheological properties of the plastics to which they have been added, more particularly low pressure filter values (high filter lifetimes) and effective spinnability.

The present invention is illustrated in more detail by way of example below.

EXAMPLES

Production and Testing of Preparations of the Invention

The preparations are produced by grinding a suspension of a g of silica (A), b g of additive (B), c g of antioxidant (C1), and, if appropriate, d g of filler (C2) in 150 g of water (in the case of pH values <7, adjusted to a pH of 7 by addition of 25% strength by weight sodium hydroxide solution) in a ball mill to a $d_{50}$ value of <1 µm, and then spray-drying the resulting suspension in a laboratory spraying tower (mini spray dryer B-191, Büchi; gas entry temperature 170° C., gas exit temperature 70° C.).

The matting of the preparations is determined by colorimetry in a transparent varnish of a water-based emulsion paint. For this purpose a mixture of 1.25 g of each preparation and 50 g of a water-based test binder based on styrene/acrylate (test binder 00-1627, BASF) is homogenized in a 150 ml plastic beaker using a high-speed stirrer at 1500 rpm for 3 minutes. The paint obtained is then drawn down onto black/white test card using a 100 µm spiral-wound coating bar, and dried for 30 minutes.

The preparations of the invention here exhibit matting which is comparable with that of the respective analogous aqueous formulations available commercially.

The table below sets out the compositions of the preparations produced. The amount of the additives (B) refers to the dissolved polymer itself when the polymers were used in solution. Additives (B) used are as follows:

A1: silica: Acematt TS 100 (Evonik);
A2: silica: Aerosil 200 (Evonik);
B1: block copolymer based on ethylenediamine/propylene oxide/ethylene oxide, with an ethylene oxide content of 40% by weight and an average molecular weight $M_n$ of 12 000;
B2: aqueous solution of a copolymer of 40 mol % isobutene, 47 mol % maleic acid, and 3 mol % $C_{18}$ olefin (solids content: 25%; pH: 8; $M_w$: 10 000);
C1: antioxidant Irganox 1010 (Ciba SC): 1.0% by weight;
C2: filler: barium sulfate Blanc fixe (Sachtleben).

TABLE

| Examples | A1 | A2 | B1 | B2 | C1 | C2 |
|---|---|---|---|---|---|---|
| 1 | 60 |  | 20 | 20 |  |  |
| 2 | 40 |  | 20 | 20 |  | 20 |
| 3 | 40 |  | 20 | 19 | 1 | 20 |
| 4 |  | 40 | 20 | 19 | 1 | 20 |
| 5 | 30 |  | 20 | 20 |  | 30 |
| 6 | 40 |  | 30 | 10 |  | 20 |
| 7 | 40 |  | 37 | 3 |  | 20 |
| 8 | 40 |  | 36 | 3 | 1 | 20 |

The invention claimed is:

1. A solid silica preparation in granule form comprising
   (A) 30% to 60% by weight, based on the total weight of the preparation, of a silica;
   (B) 20% to 50% by weight, based on the total weight of the preparation, of at least one additive selected from the group consisting of a water-soluble, nonionic, surface-active additive based on polyethers, a water-soluble, surface-active additive comprising carboxylate groups, a polyurethane, and an anionic, surface-active additive based on acidic phosphoric, phosphonic, sulfuric or sulfonic esters;
   (C) further components comprising no pigments, wherein component (C) comprises 0.1% to 5% by weight, based on the total weight of the preparation, of an antioxidant, and
   the sum of all components (A), (B), and (C) comprise 100% by weight of the solid silica preparation.

2. The preparation according to claim 1, wherein component (C) comprises 10% to 30% by weight, based on the total weight of the preparation, of a filler which has no intrinsic color.

3. The preparation according to claim 1, wherein component (B) has a fraction of 30% to 50% by weight, based on the total weight of the preparation.

4. A method of producing a solid silica preparation according to claim 1, comprising
   (a) wet-comminuting the aqueous suspension comprising components (A) and, optionally, (C) and also at least part of component (B);
   (b) optionally adding the remaining part of component (B); and
   (c) drying the suspension.

5. A method of introducing a solid silica preparation according to claim 1 into high molecular mass organic or inorganic materials, comprising
   incorporating the solid silica preparation, optionally after introduction into a suitable solvent, into the high molecular mass organic or inorganic material.

6. The method according to claim 5, wherein the incorporation comprises stirring or shaking.

* * * * *